United States Patent [19]

Zaveri

[11] Patent Number: 5,028,091
[45] Date of Patent: Jul. 2, 1991

[54] REMOTE SEAT BACK ADJUSTER
[75] Inventor: Vikram H. Zaveri, Springfield, Mich.
[73] Assignee: Keiper Recaro, Inc., Battle Creek, Mich.
[21] Appl. No.: 35,230
[22] Filed: Apr. 6, 1987

Related U.S. Application Data

[63] Continuation of Ser. No. 789,708, Oct. 21, 1985, abandoned, which is a continuation-in-part of Ser. No. 687,954, Dec. 31, 1984, abandoned.

[51] Int. Cl.⁵ ............................................. B60N 2/02
[52] U.S. Cl. ..................................... 297/366; 297/379
[58] Field of Search ............... 297/366, 367, 368, 369, 297/379

[56] References Cited

U.S. PATENT DOCUMENTS

| | | | |
|---|---|---|---|
| 3,866,270 | 2/1975 | Suzuki et al. | 297/379 X |
| 3,902,757 | 9/1975 | Yoshimura | 297/367 |
| 4,146,267 | 3/1979 | Mori et al. | 297/367 |
| 4,223,946 | 9/1980 | Kluting | 297/367 X |
| 4,295,682 | 10/1981 | Kluting et al. | 297/366 X |
| 4,355,846 | 10/1982 | Kluting et al. | 297/366 |
| 4,382,630 | 5/1983 | Weston | 297/367 X |
| 4,406,497 | 9/1983 | Kluting | 297/366 |
| 4,591,207 | 5/1986 | Nithamer et al. | 297/366 |

FOREIGN PATENT DOCUMENTS

| | | | |
|---|---|---|---|
| 1430115 | 7/1969 | Fed. Rep. of Germany | 297/367 |
| 2414910 | 10/1974 | Fed. Rep. of Germany | 297/367 |
| 2845281 | 4/1980 | Fed. Rep. of Germany | 297/366 |
| 1414601 | 9/1965 | France | 297/366 |
| 1342371 | 1/1974 | United Kingdom | 297/366 |

Primary Examiner—José V. Chen
Attorney, Agent, or Firm—Lloyd M. Forster

[57] ABSTRACT

Seat back adjuster having cam locked toothed pawl in sector engagement with extensive remote handle actuation including linkage providing a minimized hand lever travel and positive pawl drive out.

6 Claims, 3 Drawing Sheets

REMOTE SEAT BACK ADJUSTER

This is a File Wrapper Continuing Application of copending application Ser. No. 789,708 filed on Oct. 21, 1985 which in turn is a continuation-in-part of copending application Ser. No. 687,954 filed Dec. 31, 1984. Parent application Ser. No. 789,708 currently under appeal, is to be cancelled upon the filing of this application. Prosecution of application Ser. No. 687,954, also under appeal, now abandoned.

BACKGROUND OF THE INVENTION

In the foregoing co-pending application a 40° angular stroke of the pivoted release lever is required to actuate the linkage for adjustment of the seat back recliner hinge disclosed therein. In order to meet requirements for a commercial embodiment of such seat back adjuster, a reduction in hand lever travel was necessary which could not be achieved with the prior linkage, as employed for use in actuating ratchet recliners such as disclosed in U.S. Pat. Nos. 4,223,946, 4,223,947, and 4,355,846 all of which include a pivoted cam for locking a toothed pawl in engagement with a toothed sector for any adjustment position in the seat back hinge bracket.

SUMMARY OF THE PRESENT INVENTION

In the course of attempting to meet the commercial requirement for reduced manual release lever travel, applicant has devised new linkage which accommodates remote location of the hand lever relative to the pawl and locking cam, amplifies the cam travel responsive to hand lever actuation, eliminates one of the links employed in the disclosure of the co-pending application, provides a new compatible drive out means for positively dislodging pawl tooth engagement and provides a modified spring system for returning the pawl and cam to an engaged position of adjustment.

BRIEF DESCRIPTION OF THE DRAWINGS

FIG. 4 is a fragmentary sectional view taken along the line 4—4 of FIG.

FIG. 5 is a fragmentary sectional view taken along the line 5—5 of FIG. 1.

DESCRIPTION OF PREFERRED EMBODIMENT

Figure 1:
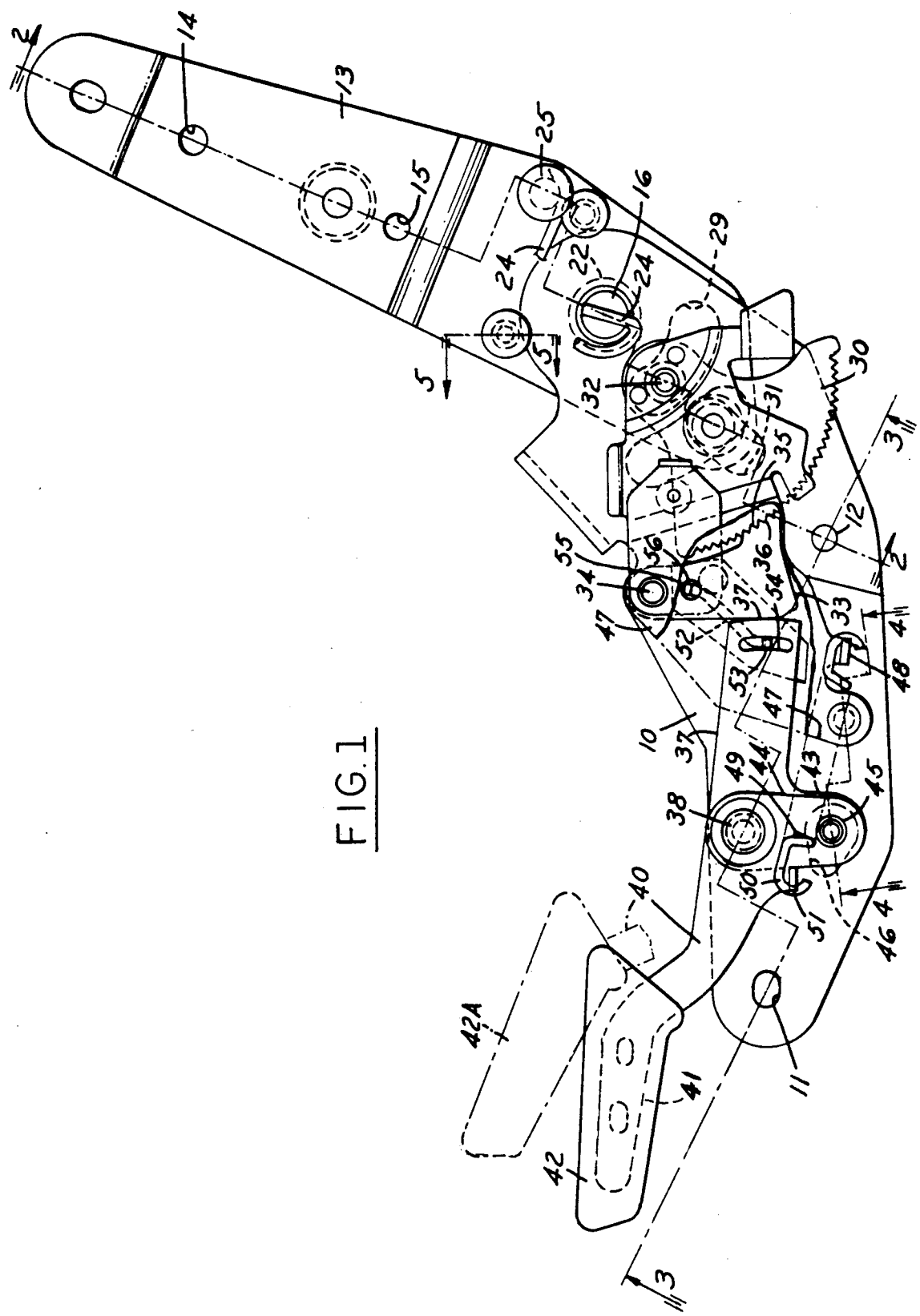
FIG. 1 is a side elevation of a seat back adjuster constructed in accordance with the present invention.
Figure 2:
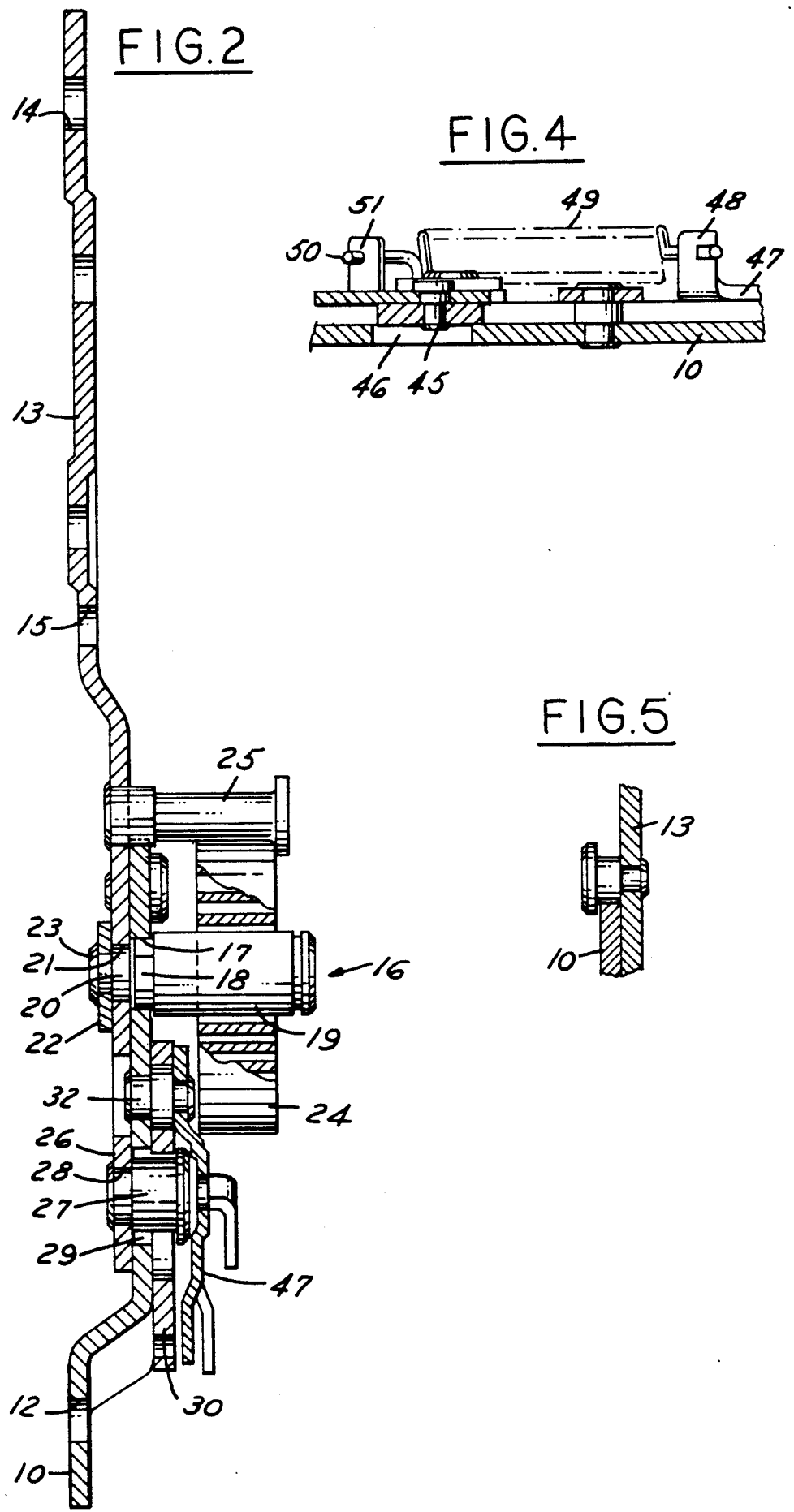
FIG. 2 is a staggered sectional view taken along the line 2—2 of FIG. 1.
Figure 3:
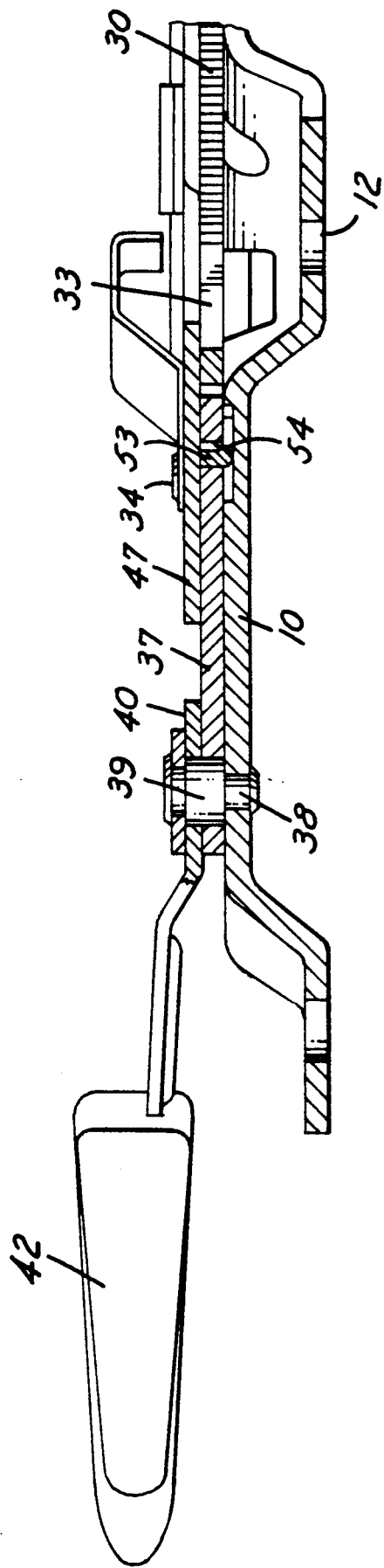
FIG. 3 is a staggered sectional view taken along the line 3—3 of FIG. 1.

With reference to FIG. 1, a seat back adjuster of the general type disclosed in co-pending application Ser. No. 687,954, which in turn is of the general type disclosed in U.S. Pat. Nos. 4,223,946, 4,223,947 and 4,355,846, is illustrated with certain additional modifications relevant to the present invention. In general the adjuster includes main lower bracket 10, adapted for attachment to a vehicle seat through bolt holes 11 and 12; and upper bracket 13 adapted for attachment to the back rest of the seat through bolt holes 14 and 15. Main pivot bolt 16 connecting the upper and lower brackets is rigidly secured to lower bracket 10 by press fit and flatted aperture 17 engaging flats 18 formed on stepped bolt cylinder 19 with reduced bolt stem 20 pivoting in aperture 21 being retained by washer 22 riveted at 23. Pivot bolt 16 anchors torque spring 24 for actuating drive connection to pin 25 riveted to upper bracket 13 serving to facilitate raising the seat back from a reclined position.

Lower end 26 of upper bracket 13 has driving stud 27 riveted at aperture 28, passing through slotted opening 29 in seat bracket 10 engaging ratchet quadrant sector 30 through slotted opening 31. Rivet 32 for sector 30 provides a pivotal mounting on lower seat bracket 10 and pawl 33 pivotally mounted to lower bracket 10 by pawl hinge bolt 34 has teeth 35 interengaging teeth 36 on sector 30. Pawl 33 is held in sector retaining engagement by eccentric cam 37 pivotally mounted at 38 to lower bracket 10 and through shouldered cylindrical rivet body 39 to handle lever 40 and lever extension 41 mounting handle 42. Both cam 37 and hand lever 40 have respective bell crank extensions 43 and 44 riveted at 45 to provide an integral assembly for actuating cam 37 about lower bracket pivot 38 through the raising of handle 42 from full line position shown to phantom position 42A.

In order to accommodate tolerance variations which determine the final locking position of cam 37 with pawl 33 fully engaged in an adjusted seat back retaining condition, which will affect the corresponding normal position of handle 42, provision is made for establishing the relative aperture locations for rivet 45 at assembly corresponding to a similar provision provided in the linkage of co-pending application Ser. No. 687,954. This may involve fabrication and assembly tooling similar to that disclosed in co-pending application Ser. No. 639,579 now U.S. Pat. No. 4,619,031.

Such provision is accommodated by tooling aperture 46 in bracket 10 and in essence involves the final location of the rivet aperture in cam 37 in a sub assembly fixture with pawl 33 and cam 37 in a fully seated position so that the matching aperture in handle extension 44 will properly position handle 42 for any final position of cam 37 under the tolerance variations of any particular parts assembled.

Side plate 47, having fixed relation to lower bracket 10, has anchor projection 48 for tension spring 49 anchored at its other end 50 to projection 51 of handle extension 44 serving to return cam 37 to its fully engaged position with pawl 33. An auxiliary knockout tension link 52 has end 53 engaging slot aperture 54 in the end of cam 37 and on end 55 engaging an aperture 56 in pawl 33 providing lost motion linkage serving to positively withdraw the pawl teeth from any engaging contact during adjustment of the seat back with the handle moved to phantom position 42A.

I claim:

1. Remote actuated seat back adjuster comprising pivotally connected seat and seat back brackets, interengaging toothed sector and pawl means for establishing angle of seat back adjustment, cam means pivotally mounted on said seat bracket for holding said pawl means in sector retaining engagement, separately fabricated hand lever means pivotally mounted on said seat bracket on the same pivot as said cam means, connecting means between said cam and said separately fabricated hand lever means including overlapping elements of said cam and hand lever means connected at a location spaced from said common pivotal connection to establish at assembly with said cam means and pawl means in sector retaining engagement an integral assembled operative relationship for angular pivotal movement, means for accommodating the determination of pivotal angular relationship to be fixed between said cam and hand lever means during assembly while said cam and pawl means are in sector retaining engagement, and said hand lever means including an extension to a remote predetermined handle position relative to the retaining interengagement of said cam and pawl means.

2. Seat back adjuster of claim 1 wherein said overlapping elements comprise, overlapping bell crank extensions on said cam and hand lever means with aligned apertures in said extensions connected at assembly.

3. Seat back adjuster of claim 2 wherein the aligned aperture in said cam means bell crank extension is located and provided at assembly to match a corresponding predetermined location in said hand lever extension when said hand lever is in said predetermined handle position.

4. Seat back adjuster of claim 1 including a tension spring anchored at one end to an element of said assembled cam and hand lever means spaced from their common pivotal connection and an element having a fixed relation to said seat bracket for biasing said hand lever and cam means towards said sector retaining engagement.

5. Seat back adjuster of claim 1 including lost motion linkage means connecting said pawl and cam means for positively retracting said pawl means out of engagement with said toothed sector upon actuation of said hand lever means to a release position.

6. Seat back adjuster of claim 5 wherein said lost motion means includes lost motion apertures in said respective pawl and cam means, and a tension link extending therebetween.

* * * * *